United States Patent [19]

Whitehead et al.

[11] Patent Number: 5,168,991

[45] Date of Patent: Dec. 8, 1992

[54] COMPACT DISC PACKAGE WITH MOVEABLE CARRIER

[75] Inventors: Ross J. Whitehead; David A. Szasz, both of Wilmington, Del.

[73] Assignee: Himont Incorporated, Wilmington, Del.

[21] Appl. No.: 773,177

[22] Filed: Oct. 8, 1991

[51] Int. Cl.⁵ .............................................. B65D 85/57
[52] U.S. Cl. ................................ 206/310; 206/45.13; 206/312; 206/444
[58] Field of Search ............... 206/309, 310, 312, 313, 206/444, 45.13, 472; 312/9, 10; 360/133

[56] References Cited

U.S. PATENT DOCUMENTS

| | | |
|---|---|---|
| D. 293,390 | 12/1987 | Sutou et al. . |
| D. 293,507 | 1/1988 | Ogusu . |
| D. 304,781 | 11/1989 | Hanson . |
| D. 304,880 | 12/1989 | Philosophe . |
| D. 311,137 | 10/1990 | Gelardi et al. . |
| D. 313,412 | 1/1991 | Holmgren . |
| 4,084,690 | 4/1978 | Pulse . |
| 4,623,062 | 11/1986 | Chase et al. . |
| 4,702,369 | 10/1987 | Philosophe . |
| 4,793,477 | 12/1988 | Manning et al. ............... 206/444 X |
| 4,793,480 | 12/1988 | Gelardi et al. ...................... 206/312 |
| 4,867,302 | 9/1989 | Takahashi ....................... 206/45.13 |
| 4,966,283 | 10/1990 | Sykes et al. . |

FOREIGN PATENT DOCUMENTS

| | | | |
|---|---|---|---|
| 8607182 | 12/1986 | PCT Int'l Appl. ................. 206/472 |
| 8806559 | 9/1988 | PCT Int'l Appl. ................. 206/444 |

OTHER PUBLICATIONS

Ivy Hills' Eco-Pak CD Package Literature (no date).

*Primary Examiner*—Bryon P. Gehman

[57] ABSTRACT

A compact disc package includes first and second covers, and a hinge connected to the first and second covers for allowing relative pivotal movement between the first and second covers. The compact disk package also includes a carrier moveable between the first and second covers and adapted to support a compact disc. The compact disc package further includes a structure for positioning the carrier between the first and second covers in a display position and for positioning the carrier in either one of the first and second covers in an open position, whereby the carrier may be moved longitudinally between the display and open positions.

20 Claims, 3 Drawing Sheets

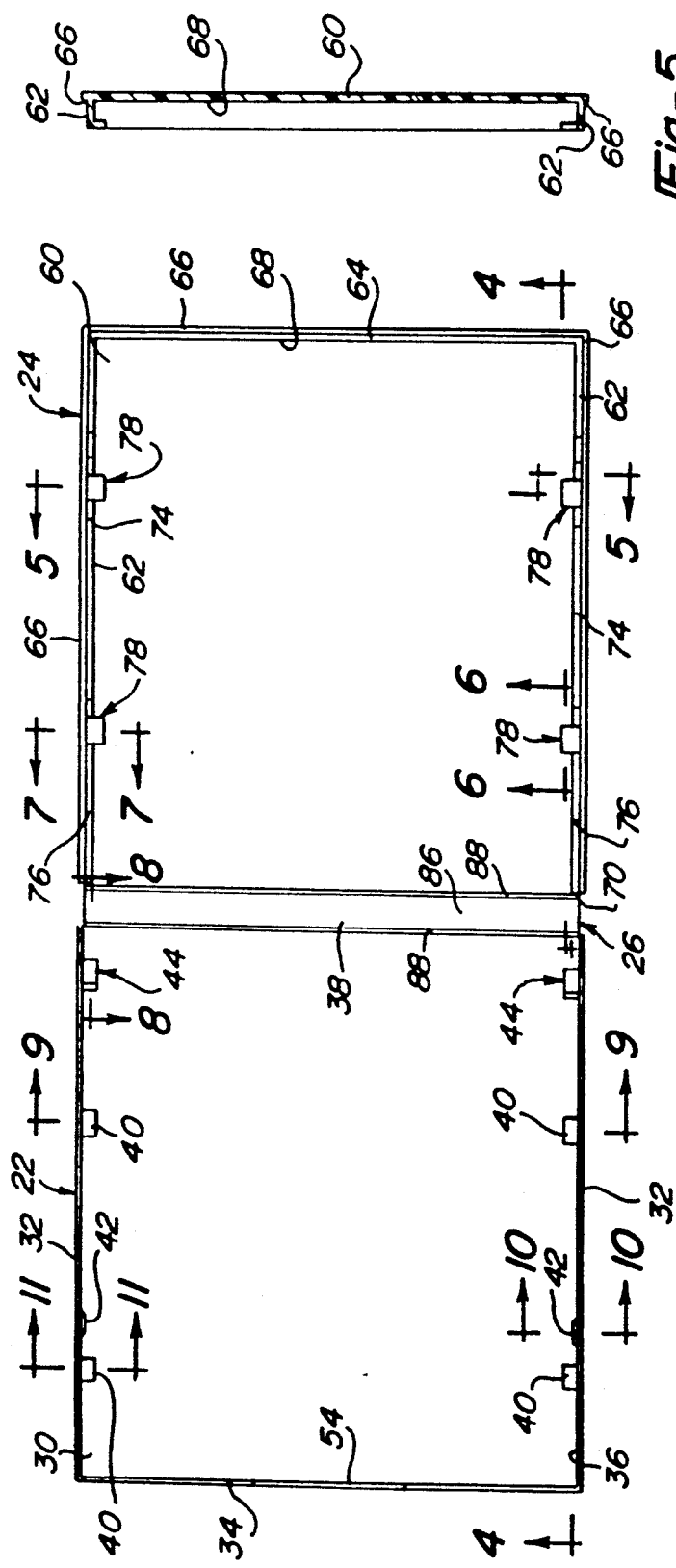

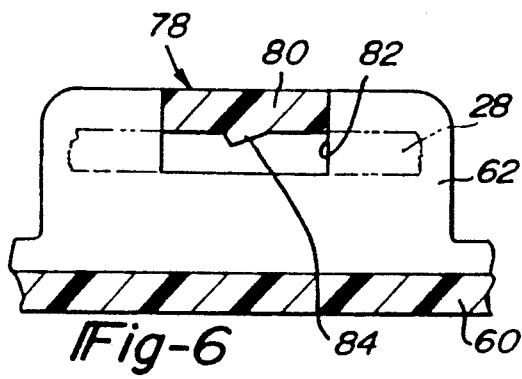
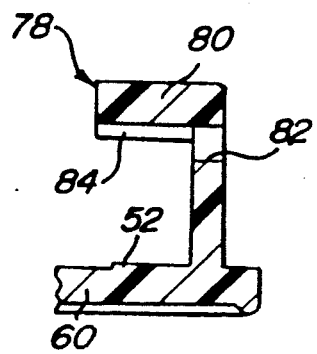
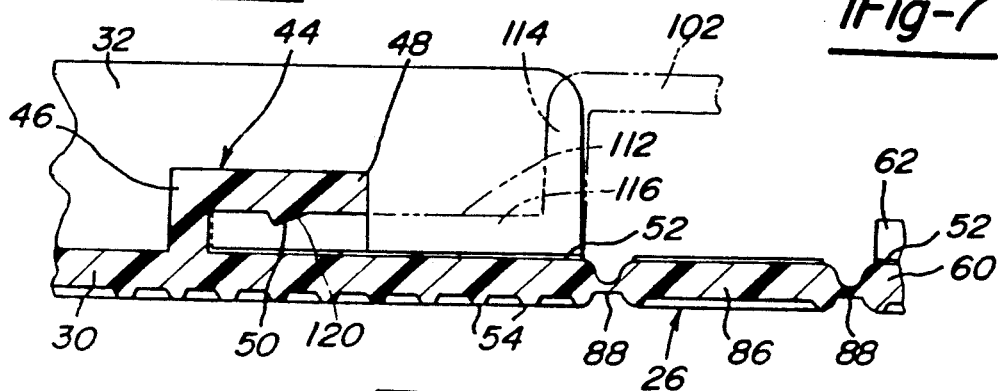
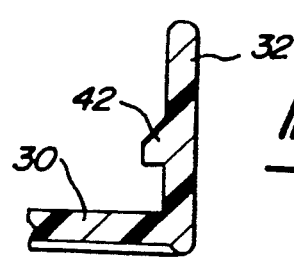
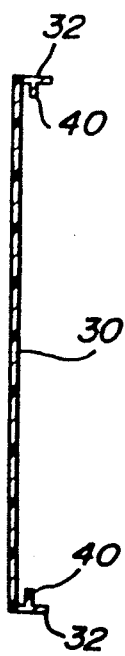
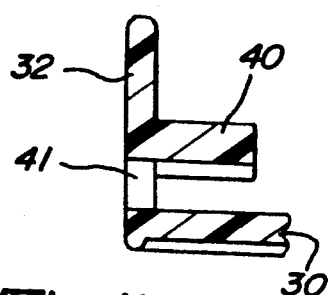

COMPACT DISC PACKAGE WITH MOVEABLE CARRIER

BACKGROUND OF THE INVENTION

1. Field of the Invention

The present invention relates generally to compact discs, and more particularly, to a compact disc package.

2. Description of the Related Art

Typically, a compact disc package is used to display and store a compact disc (CD). An example of such a compact disc package includes a hinged upper and lower cover member and a carrier disposed therebetween to retain or support a CD. The compact disc package also includes a hinged paper material or booklet having one edge hinged to the lower cover member. In a display position, the upper and lower cover member are open and lie in the same plane. Also, the booklet is open and lies in a parallel plane to cover the opened side of the upper and lower cover members. The compact disc package is 4 ⅞" by 11 ½" in the display mode.

To open the compact disc package, the booklet is rotated about the hinge at the lower cover member to lie in the same plane as the upper and lower cover members. The carrier is initially located in the upper cover member. The carrier is then slid from the upper cover member to the lower cover member to be fully seated in the lower cover member. The booklet is then folded along its hinge and rotated about the hinge at the lower cover member to rest on top of the carrier. The upper cover member is then closed onto the lower cover member to a jewel box size, e.g. 4 ⅞"×5 9/16".

One problem with the above-identified compact disc package is that the booklet in addition to the overall package may be damaged during shipment or when opened and cannot be replaced by a readily available substitute. Another problem is that graphics or printed material in addition to the booklet is used which is wasteful and environmentally unfriendly. Yet another problem is that the booklet is not separate or removable from the cover members. Still another problem is that the CD is hidden from external view. A further problem is that opening of the compact disc package is time consuming. Yet a further problem of the compact disc package is that it is costly to produce.

CD packages presently available in their retail display mode are generally in a long box configuration using, inter alia, a cardboard piece or vacuum formed plastic piece covered with shrink-wrap.

SUMMARY OF THE INVENTION

It is, therefore, one object of the present invention to provide a compact disc package.

It is another object of the present invention to provide a compact disc package that is environmentally friendly.

It is yet another object of the present invention to provide a compact disc package which avoids damage of the booklet during shipment or when opened and is durable during subsequent handling or use over time.

It is still another object of the present invention to provide a booklet which may be removed from the compact disc package.

It is a further object of the present invention to provide a compact disc package which allows external viewing of the CD.

It is yet a further object of the present invention to provide a compact disc package which requires less time to open after purchase.

It is another object of the present invention to provide a compact disc package in which the carrier is positioned between the covers in a display position.

It is still a further object of the present invention to provide a compact disc package in which the carrier may be locked as a bridge between upper and lower covers in a display and open position.

It is another object of the present invention to provide a compact disc package in which the CD cannot be removed when the compact disc package is in a display position even though the CD may be visible.

It is still another object of the present invention to provide a compact disc package which is economical and less costly to produce.

It is a further object of the present invention to be essentially compatible with current automated loading and packaging machinery designed around the existing package type, thereby keeping labor and plant reinvestment expenses negligible.

It is yet a further object of the present invention to provide a new and improved compact disc package.

To achieve the foregoing objects, the present invention is compact disc package including first and second covers, and a hinge connected to the first and second covers to allow relative pivotal movement between the first and second covers. The compact disc package also includes a carrier moveable in a sliding motion between the first and second covers and adapted to support a compact disc. The compact disc package further includes means for positioning the carrier between the first and second covers in a display position and for positioning the carrier in either one of the first and second covers in an open position, whereby the carrier may be moved longitudinally between the display and open positions.

One advantage of the present invention is that the compact disc package has only one internal booklet and printed paper sheet, without any other additional exterior packaging materials except for the shrink-wrap, making the compact disc package environmentally friendly. Another advantage of the present invention is that the booklet is not prone to damage when the compact disc package is shipped or opened. Yet another advantage of the present invention is that the booklet is separate and may be removed from the compact disc package. Still another advantage of the present invention is that only shrink-wrap covers the CD, thereby allowing the CD to be viewed externally. A further advantage of the present invention is that only shrink-wrap covers the compact disc package in a display position, thereby requiring less time to open the compact disc package. Yet a further advantage of the present invention is that the carrier may be locked in a display and open position. Another advantage of the present invention is that the carrier may be located between the covers when the compact disc package is in a display position. Yet another advantage of the present invention is that the CD may not be removed from the carrier when the compact disc package is in a locked display position. Still a further advantage of the present invention is that the compact disc package eliminates the booklet being hinged to one cover and separate graphics, making the compact disc package more economical and less costly to produce. Yet a further advantage of the present invention is that the CD package eliminates exterior packaging materials except for shrink-wrap. Another advantage is that the CD package of the present invention comprises two moldings rather than the three moldings of current CD packages, thereby making the CD package more economical to produce.

Other objects, features and advantages of the present invention will be readily appreciated as the same becomes better understood after reading the following description taken in conjunction with the accompanying drawings.

BRIEF DESCRIPTION OF THE DRAWINGS

FIG. 3 is an elevational view of a portion of the compact disc package of FIGS. 1 and 2.

FIG. 4 is a sectional view taken along line 4—4 of FIG. 3.

FIG. 5 is a sectional view taken along line 5—5 of FIG. 3.

FIG. 6 is a sectional view taken along line 6—6 of FIG. 3.

FIG. 7 is a sectional view taken along line 7—7 of FIG. 3.

FIG. 8 is a sectional view taken along line 8—8 of FIG. 3.

FIG. 9 is a sectional view taken along line 9—9 of FIG. 3.

FIG. 10 is a sectional view taken along line 10—10 of FIG. 3.

FIG. 11 is a sectional view taken along line 11—11 of FIG. 3.

DESCRIPTION OF THE PREFERRED EMBODIMENT(S)

Figure 1:
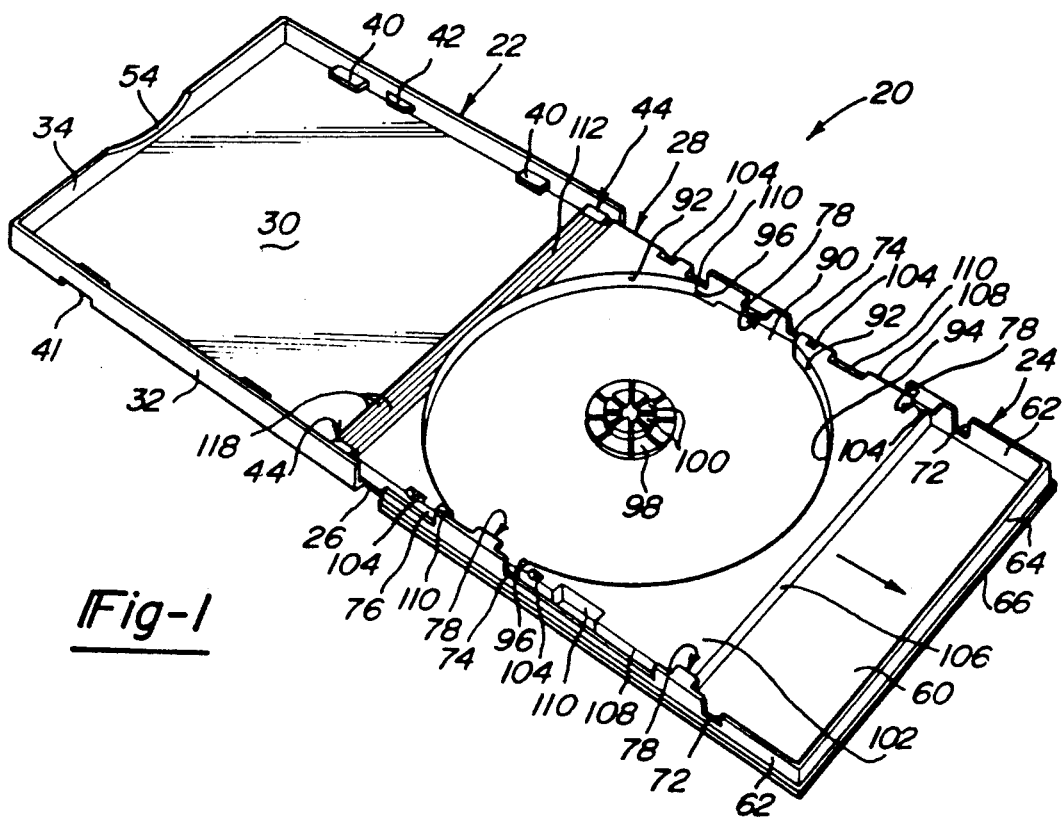
FIG. 1 is a perspective view of a compact disc package according to the present invention in a display position.
Figure 2:
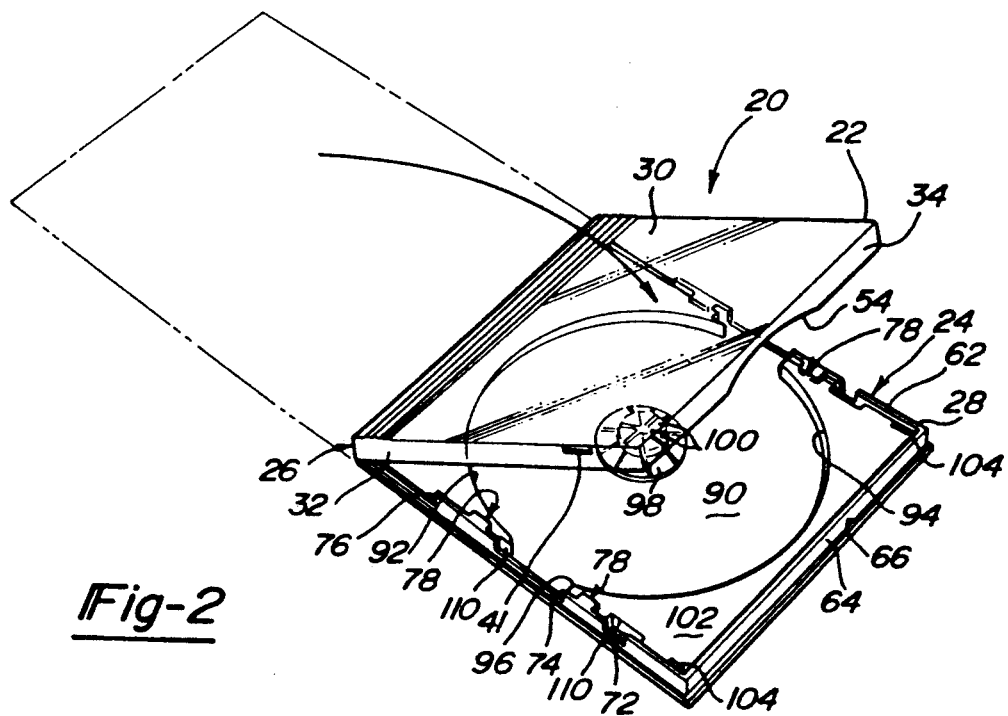
FIG. 2 is a view similar to FIG. 1 with the compact disc package in an open position.

Referring to FIGS. 1 and 2, a compact disc package 20 according to the present invention is shown. The compact disc package 20 is adapted to display and store a record or compact disc (CD) (not shown). The compact disc package 20 generally includes an upper or first cover 22, a lower or second cover 24, a hinge 26 interconnecting the first and second covers 22 and 24, which can be integrally molded, and a carrier 28 moveable within the first and second covers 22 and 24. The carrier 28 is adapted to support or retain the CD and stiffen the first and second covers 22 and 24 in an open position.

Referring to FIGS. 3 and 4, the first cover 22 has a base wall 30 which is generally rectangular and planar in shape. The first cover 22 also has a pair of side walls 32 and an end wall 34 extending generally perpendicular from the base wall 30 to form a generally rectangular cavity 36 with an opening 38 at the end opposite the end wall 34. The side and end walls 32 and 34 are generally rectangular in shape and located about an outer periphery of the base wall 30. Preferably, the base wall 30, side walls 32 and end wall 34 are integral.

Referring to FIGS. 3, 4, 7 and 9 through 11, the first cover 22 also includes at least one, preferably a plurality of side projections 40 extending generally perpendicular from the side walls 32 and into the cavity 36. Preferably, each side wall 32 has a pair of side projections 40 spaced longitudinally from each other and vertically from the base wall 30. The side projections 40 are generally rectangular in shape and are integral with the side walls 32. The side walls 32 include an aperture 41 extending therethrough between the base wall 30 and each side projection 40. The side projections 40 are adapted to removably retain printed material or a booklet (not shown) between the base wall 30 and side projections 40. It should be appreciated that the booklet is disposed between the base wall 30 and side projections 40 and may be removed by sliding the booklet out the openings 38 or 54.

The first cover 22 further includes at least one, preferably a pair of retaining projections 42 extending generally perpendicular from the side walls 32 and into the cavity 36. Preferably, each side wall 32 has at least one retaining projection 42 spaced vertically from the base wall 30. The retaining projections 42 are generally trapezoidal in shape and integral with the side walls 32. The retaining projections 42 are adapted to retain the first cover 22 to the lower cover 24 to be described.

Referring to FIGS. 3, 4 and 8, the first cover 22 further includes at least one, preferably a pair of end positioning tabs, generally indicated at 44, adapted for positioning the carrier 28 between the first and second covers 22 and 24 to hold the first cover 22 open relative to the second cover 24 in a display position. The end positioning tabs 44 are generally an inverted "L" shape in cross-section. The end positioning tabs 44 have a vertical portion 46 extending generally perpendicular from the base wall 30 and a horizontal position 48 extending generally perpendicular from the vertical portion 46. Preferably, one end positioning tab 44 is located near each side wall 32 and the opening 38. Each end positioning tab 44 has a locking projection 50 which extends from the horizontal portion 48 toward the base wall 30. The locking projection 50 is generally a "V" shape. Preferably, the base wall 30 and end positioning tabs 44 are integral.

As illustrated in FIGS. 7 and 8, the first cover 22 includes at least one, preferably a pair of tracks or risers 52 extending from the base wall 30 and into the cavity 36. Preferably, one riser 52 is located near each side wall 32. The riser 52 is generally rectangular in shape. The riser 52 is adapted for guiding the carrier 28 between the display position of FIG. 1 and the open position of FIG. 2, and also for providing a non-interference recess for an enclosed graphic paper sheet (not shown). It should be appreciated that the carrier 28 includes corresponding channels (not shown) for matingly engaging the risers 52.

Referring to FIGS. 1 through 3, the first cover 22 includes a recess 54 in the end wall 34. The recess 54 is generally arcuate in shape to allow an operator to easily move the first cover 22 from the second cover 24. The first cover 22 also includes at least one, preferably a plurality of ribs 56 extending from an exterior of the base wall 30 near the opening 38. The ribs 54 provide a textured surface for handling by an operator. It should be appreciated that the riser 52 and ribs 54 may be optional.

Referring to FIGS. 3 through 5, the second cover 24 has a base wall 60 which is generally rectangular and planar in shape. The second cover 24 also has a pair of side walls 62 and an end wall 64 extending generally perpendicular from the base wall 60. The side and end walls 62 and 64 are located inwardly from an outer periphery of the base wall 60 to form a ledge 66 generally having a width of the thickness of side and end walls 32 and 34 of the first cover 22. The base wall 60, side walls 62 and end wall 64 form a generally rectangular cavity 68 with an opening 70 at the end opposite the end wall 64. The side and end walls 62 and 64 are generally rectangular in shape. Preferably, the base wall 60, side walls 62 and end wall 64 are integral. The second cover 24 includes the riser 52 extending from the base wall 60 near each side wall 64. The riser 52 is adapted for guiding the carrier 28 along the second cover 24.

Referring to FIGS. 3 through 8, the second cover 22 includes at least one, preferably a plurality of first recesses 72 along the side walls 62. Preferably, each side wall 62 has one of the recesses 72 spaced longitudinally from the end wall 64 to correspond with the side projections 40 near the end wall 34 of the first cover 22. The first recesses 72 are generally rectangular in shape and adapted to receive the side projections 40 to allow the first cover 22 to seat or close on the second cover 24. The second cover 22 also includes at least one, preferably a plurality of second recesses 74 along the side walls 62. Preferably, each side wall 62 has one of the second recesses 74 located midway between the end wall 66 and the opening 70. The second recesses 74 are generally rectangular in shape and have a width greater than the first recesses 72. The second recesses 74 are adapted to cooperate with the carrier 28 to allow the CD to be removed when the carrier 28 is in the open position. The second recesses 74 are also adapted to receive the other side projections 40 to allow the first cover 22 to close on the second cover 24. The second cover 24 further includes at least one, preferably a plurality of third recesses 76 along the side walls 64. Preferably, each side wall 62 has one of the third recesses 76 near the opening 70.

The second cover 24 includes at least one, preferably a plurality of side positioning tabs, generally indicated at 78, adapted for positioning the carrier 28 in the display and open positions, illustrated in FIGS. 1 and 2, respectively. The side positioning tabs 78 are generally rectangular in shape. The side positioning tabs 78 have a horizontal portion 80 extending generally perpendicular from the side walls 62 and into the cavity 68. Preferably, each side wall 62 has a pair of side positioning tabs 78 spaced longitudinally from each other and vertically from the base wall 60. The side positioning tabs 78 are integral with the side walls 62. The side walls 62 include a retaining aperture 82 extending therethrough between the base wall 60 and side positioning tab 78. The retaining apertures 82 are adapted to receive the retaining projections 42 for the side positioning tabs 78 near the end wall 64 to retain the first cover 22 to the second cover 24. The side positioning tabs 78 have a locking projection 84 which extends from the horizontal portion 80 toward the base wall 60. Preferably, the locking projection 84 is generally a "V" shape and integral with the horizontal portion 80.

The hinge 26 has a generally rectangular base 86 including the riser 52 extending from the base 86 near the sides thereof. The hinge 26 also has a web 88 extending longitudinally from each end to connect the base walls 30 and 60 to the base 86. The web 88 has a thickness less than a thickness of the base walls 30 and 60. The web 88 has a sufficient width and length to allow the base walls 30 and 60 and base 86 to pivot or rotate relative to each other. Preferably, the hinge 16 is integrally molded with the first and second covers 22 and 24 to form a "living hinge". It should be appreciated that the hinge 16 may be formed as a "pivotal hinge" in which the first and second covers 22 and 24 are formed as separate members in which one of the members has a tab or blip and the other member has a corresponding orifice or opening into which the tab or blip fits, thereby providing a pivotal connection between the two members. It should also be appreciated that the pivotal hinge is conventional and known in the art.

Preferably, the first cover 22, second cover 24 and hinge 28 are made of a plastic material. In the preferred embodiment, random copolymers of propylene and ethylene containing less than 10 mol. % ethylene, most preferably less than 6 mol. % ethylene is used as the plastic material. Preferably, the plastic material is clear or transparent. It should be appreciated that any suitable plastic material may be used or that the plastic material may be colored or opaque.

Referring to FIGS. 1, 2, 6 and 8, the carrier 28 is moveable between the first and second covers 22 and 24 and adapted to support or retain a CD. The carrier 28 is generally rectangular in shape. The carrier 28 has a base wall 90 and a pair of opposed cavity walls 92. The cavity walls 92 are generally arcuate in shape to form a generally circular cavity 94 to receive the CD. The cavity walls 92 terminate at the sides of the base wall 90 to form openings 96 to allow an operator to grasp the CD when the carrier 28 is in the open position illustrated in FIG. 2. The carrier 28 also includes a generally circular retainer member 98 located centrally of the cavity walls 92 on the base wall 90. The retainer member 98 includes a plurality of upstanding projections 100 located centrally thereof and arranged in a substantially circular formation of a predetermined diameter so as to fit securely within a central aperture of a CD and bear against the inner edge thereof securing the CD within the cavity 94 of the carrier 28. It should be appreciated that the retainer member 98 is conventional and known in the art.

The carrier 28 also has a top wall 102 extending longitudinally from the cavity walls 92. The top wall 102 is generally planar. The top wall 102 includes at least one, preferably a plurality of locking recesses 104. Preferably, the top wall 102 has three (3) locking recesses 104 located along each side and spaced longitudinally at predetermined locations. The locking recesses 104 are generally a "V" shape and adapted to receive the locking projections 84 of the side positioning tabs 78. It should be appreciated that the locking projections 84 cooperate with the locking recesses 104 to lock the carrier 28 in the display and open positions.

The carrier 28 includes an end wall 106 and side walls 108 extending generally perpendicular from an outer periphery of the top wall 102. The carrier 28 also includes at least one, preferably a plurality of side recesses 110 at the juncture of the top wall 102 and side walls 108. The side recesses 110 extend vertically along the side walls 108 to receive the side projections 40 and allow the first cover 22 to close on the second cover 24. The carrier 28 further includes a handle portion 112 at the end opposite the end wall 100. The handle portion 112 has a vertical portion 14 extending generally perpendicular from the top wall 102 and a horizontal portion 116 extending generally perpendicular from the vertical portion 114 as illustrated in FIG. 8. The horizontal portion 116 has at least one, preferably a plurality of recesses 118 to provide a texture surface for handling by an operator. The handle portion 112 has at least one, preferably a plurality of locking recesses 120. Preferably, one locking recess 120 is disposed at a predetermined location along each side. The locking recesses 120 are generally a "V" shape and adapted to receive the locking projections 50 of the end positioning tabs 44 to lock the carrier 28 in the display position.

Preferably, the carrier 28 is made of a plastic material. In the preferred embodiment, random copolymers of propylene and ethylene containing less than 10 mol. % ethylene, most preferably less than 6 mol. % ethylene is used as the plastic material. Preferably, the plastic material is opaque. It should be appreciated that any suitable plastic material may be used or that the plastic material may be colored or transparent.

In operation, the first cover 22, second cover 24, and hinge 26 are molded as one piece by conventional injection molding. Also, the carrier 28 is molded by conventional injection molding. The CD is pressed by conventional methods and placed in the cavity 94 of the carrier 28 such that the retainer member 98 engages the CD. The printed material and/or booklet is inserted into either or both the first and second covers 22 and 24. The carrier 28 is loaded in the second cover 24 by aligning the side recesses 110 with the side positioning tabs 78. The carrier 28 is moved or slid toward the first cover 22 such that the end positioning tabs 44 and side positioning tabs 78 near end wall 64 are deflected and the locking projections 50 and 84 engage the locking recesses 120 and 104, respectively. When this occurs, the carrier 28 is positioned in the display position illustrated in FIG. 1 and the first and second covers 22 and 24 are locked open and rigid. Also, the side positioning tabs 78 near the opening 70 are located over the openings 96 of the carrier 28 to prevent the CD from being removed. The compact disc package 10 is then shrink-wrapped and locked for retail distribution.

To open the compact disc package 20, an operator removes the shrink-wrap. Per the arrow illustrated in FIG. 1, the operator moves or slides the carrier 28 with their hand. As a result, the end and side positioning tabs 44 and 78 deflect such that the locking projections 50 and 84 disengage the recesses 104 and 120, respectively. The carrier 28 moves until the end wall 106 is near the end wall 64 of the second cover 24 and the side positioning tabs 78 are deflected such that the projections 84 engage the other locking recesses 104. When this occurs, the carrier 28 is positioned in the open position and either the CD may be removed or the first cover 22 closed on the second cover 24.

To close the compact disc package 20, the base 86 of the hinge 26 and first cover 22 are rotated due to flexing of the webs 88. Rotation continues until the side projections 40 are received in the recesses 72, 74 and 110 and the retaining projections 42 are received in the retaining apertures 42. The side and end walls 32 and 34 of the first cover 22 rest on the ledges 66 of the second cover 24. The compact disc package 20 is then in a standard jewel box size.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A compact disc package, comprising:
   first and second covers, said first and second covers extending longitudinally in a plane to define an open position and said first and second covers overlapping each other to define a closed position;
   a hinge connected to said first and second covers to allow relative pivotal movement of said first and second covers between said open and closed positions;
   a carrier movable longitudinally between said first and second covers when said first and second covers are in said open position and adapted to support a compact disc (CD); and
   positioning means for positioning said carrier longitudinally between said first and second covers when said first and second covers are in said open position to define a display position and for positioning said carrier in either said first and second covers in said open and closed positions, whereby the carrier may be moved longitudinally between the display and open positions.

2. A compact disc package as set forth in claim 1 including locking tab means for preventing the CD from being removed from said carrier when in said display position.

3. A compact disc package as set forth in claim 1 wherein said first cover comprises a first base wall, and a pair of opposed first side walls and a first end wall to form a first cavity having a first opening opposite said first end wall.

4. A compact disc package as set forth in claim 3 wherein said second cover comprises a second base wall, and a pair of opposed second side walls and a second end wall to form a second cavity having a second opening opposite said second end wall.

5. A compact disc package as set forth in claim 4 wherein said hinge comprises a base having a web at each end or other hinging means interconnecting said base and said first and second base walls.

6. A compact disc package as set forth in claim 5 wherein said first cover includes at least one side projection extending inwardly from either of said first and second side walls and adapted to dispose printed material between said side projection and either of said first and second base walls.

7. A compact disc package as set forth in claim 6 wherein said first cover and said hinge and said second cover are integral and one-piece.

8. A compact disc package as set forth in claim 1 including guiding means for guiding said carrier between said display and open positions.

9. A compact disc package as set forth in claim 8 wherein said guiding means comprises at least one riser extending longitudinally along said first cover and said hinge and said second cover.

10. A compact disc package, comprising:
    first and second covers;
    a hinge connected to said first and second covers to allow relative pivotal movement between said first and second covers;
    a carrier movable between said first and second covers and adapted to support a compact disc (CD);
    positioning means for positioning said carrier between said first and second covers in a display position and for positioning said carrier in either said first and second covers in an open position, whereby the carrier may be moved between the display and open positions;
    locking tab means for preventing the CD from being removed from said carrier when in said display position; and wherein said locking tab means comprises at least one positioning tab extending from one of said first and second covers and at least partially overlapping the CD.

11. A compact disc package, comprising:
first and second covers;
a hinge connected to said first and second covers to allow relative pivotal movement between said first and second covers;
a carrier movable between said first and second covers and adapted to support a compact disc (CD);
positioning means for positioning said carrier between said first and second covers in a display position and for positioning said carrier in either said first and second covers in an open position, whereby the carrier may be moved between the display and open position; and
wherein said positioning means comprises at least one positioning tab extending inwardly from either said first and said second covers, and a plurality of recesses located at predetermined locations along said carrier and adapted to engage said at least one positioning tab in said display and open positions.

12. A compact disc package, comprising:
a first cover and a second cover;
said first cover comprising a first base wall, and a pair of opposed first side walls and a first end wall to form a first cavity having a first opening opposite said first end wall;
said second cover comprising a second base wall, and a pair of opposed second side walls and a second end wall to form a second cavity having a second opening opposite said second end wall;
a hinge connected to said first and second base walls to allow relative pivotal movement between said first and second covers;
a carrier movable between said first and second cavities through said first and second openings and adapted to support a compact disc (CD); and
at least one positioning tab extending inwardly from said first and said second covers, and a plurality of recesses at predetermined locations along said carrier and adapted to engage said at least one positioning tab to position said carrier between said first and second covers in a display position and to position said carrier in said second cover in an open position.

13. A compact disc package, comprising:
first and second covers, said first and second covers extending longitudinally in a plane to define an open position and said first and second covers overlapping each other to define a closed position;
a hinge connected to said first and second covers to allow relative pivotal movement of said first and second covers between said open and closed positions;
a carrier movable longitudinally between said first and second covers when said first and second covers are in said open position and adapted to support a compact disc (CD);
positioning means for positioning said carrier longitudinally between said first and second covers when said first and second covers are in said open position to define a display position and for positioning said carrier in either said first and second covers in said open and closed positions, whereby the carrier may be moved longitudinally between the display and open positions; and locking tab means for preventing the CD from being removed from said carrier when in said display position.

14. A compact disc package as set forth in claim 13 wherein said carrier comprises a base wall and means forming a cavity on said base wall adapted to contain a CD.

15. A compact disc package, comprising:
first and second covers;
a hinge connected to said first and second covers to allow relative pivotal movement between said first and second covers;
a carrier movable between said first and second covers and adapted to support a compact disc (CD);
positioning means for positioning said carrier between said first and second covers in a display position and for positioning said carrier in either said first and second covers in an open position, whereby the carrier may be moved between the display and open positions;
locking tab means for preventing the CD from being removed from said carrier when in said display position;
said carrier comprising a base wall and means forming a cavity on said base wall adapted to contain a CD; and
wherein said locking tab means comprises at least one first positioning tab extending from either of said first and second covers and at least partially overlapping the cavity and CD.

16. A compact disc package as set forth in claim 15 wherein said positioning means comprises at least one second positioning tab extending inwardly from either one of said first and said second covers, and a plurality of recesses located at predetermined locations along said carrier and adapted to engage said at least one second positioning tab in said display and open positions.

17. A compact disc package as set forth in claim 16 wherein said at least one first positioning tab includes a projection for engaging one of said recesses when said carrier is in said open position.

18. A compact disc package, comprising:
first and second covers;
a hinge connected to said first and second covers to allow relative pivotal movement between said first and second covers;
a carrier movable between said first and second covers and adapted to support a compact disc (CD);
positioning means for positioning said carrier between said first and second covers in a display position and for positioning said carrier in either said first and second covers in an open position, whereby the carrier may be moved between the display and open positions;
locking tab means for preventing the CD from being removed from said carrier when in said display position;
said locking tab means comprising at least one first positioning tab extending from said second cover and at least partially overlapping the CD; and
said positioning means comprising at least one second positioning tab extending inwardly from either said first and said second covers, and a plurality of locking recesses located at predetermined locations along said carrier and adapted to engage said at least one second positioning tab in said display and open positions.

19. A compact disc package as set forth in claim 18 wherein said at least one first positioning tab includes a first locking projection for engaging one of said locking recesses when said carrier is in said open position.

20. A compact disc package as set forth in claim 19 wherein said at least one second positioning tab includes a second locking projection for engaging one of said locking recesses when said carrier is in said display position.

* * * * *